S. T. HUDSON.
Cane-Stripper.
No. 64,875.
Patented May 21, 1867.
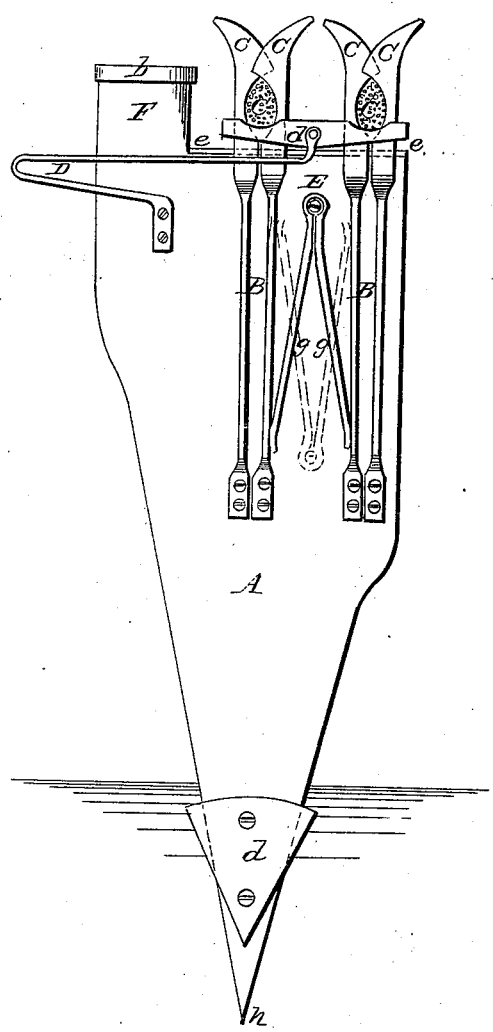
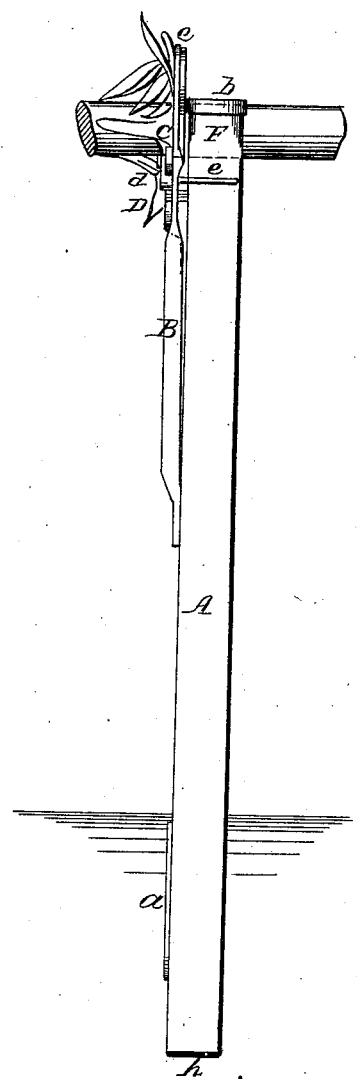
Witnesses:
Theo Tusch
J A Service
Inventor:
S T Hudson
Per Munn & Co
Attorneys

United States Patent Office.

S. TERRY HUDSON, OF SUCCESS, NEW YORK.

Letters Patent No. 64,875, dated May 21, 1867.

IMPROVEMENT IN SUGAR-CANE STRIPPER.

The Schedule referred to in these Letters Patent and making part of the same.

TO ALL WHOM IT MAY CONCERN:

Be it known that I, S. TERRY HUDSON, of Success, in the county of Suffolk, and State of New York, have invented a new and improved Sugar-Cane Stripper; and I do hereby declare that the following is a full, clear, and exact description thereof, which will enable others skilled in the art to make and use the same, reference being had to the accompanying drawings, forming part of this specification, in which—

Figure 1 is a side view of my improved cane-stripper.
Figure 2 is an edge view of the same.
Similar letters of reference indicate like parts.

This invention relates to a new and improved device for stripping off the leaves of sugar cane; and consists in an arrangement of springs in pairs fixed upon a movable stand-support, which may be stuck upright in the ground in the field anywhere convenient to the cane, and shifted about as the leaves accumulate in stripping so as to save handling them. It is very simple, cheap, and effective.

A is a wooden stand or support, a little over three feet long, sharpened at the lower end, provided with a spud, $a$, and having a head, F, protected with an iron band, $b$, for driving it into the ground with the pointed end $h$. On the side of the upper end of the stand A are placed two pairs of steel springs, B B, side by side, fastened at their lower ends, and having flat heads or jaws, $c$ $c$, which open and slide by each other like sheep-shears, so that a stalk of cane can be pushed between them into spaces C C in the jaws of each pair of springs, as shown in fig. 1. The edges of the springs in the spaces C C are made square, and sharp on the cutting side, for stripping the leaves easily when the cane is drawn through, and on the outside of the springs is placed a steel guard-plate, $d$, extending across and lying partly over the spaces C C. The outside cutting edges of the guard-plate $d$ are also square and sharp, and this plate is hung in the middle by a swivel-joint to the end of a spring, D, that is fastened at the other end to the stand A in such manner that the plate may be depressed for enlarging either of the spaces C C, or both at the same time. On the opposite side of the springs B B a friction-plate, $e$, is fixed on the top of the stand A for the springs to bear against the edge just below the spaces C C.

To operate with this device the sharp end of the stand A is driven into the ground and held firmly by the spud $a$, and a lot of canes are placed with their heads resting on a trestle opposite the stand, when the operator takes a cane in each hand and presses the stalk down through the jaws $c$ $c$ of the springs B B, and drawing the canes through the spaces C C strips the leaves rapidly, as shown in fig. 2. As soon as the leaves accumulate to be in the way the place of the stand is shifted, and thus the labor of removing them is saved. For stripping frosted cane stronger springs are required, and I provide an extra double spring, E, like tongs, which is placed with the jaws $g$ $g'$ opening downward between the springs B B for ordinary cane, in which position they are inoperative, as shown in fig. 1; but is reversed with the jaws opening upward, as shown in red, when needed to stiffen the springs B B for stripping frosted cane.

Having thus described my invention and its operation, I claim as new, and desire to secure by Letters Patent—

1. The double pairs of springs B B, having lap-jaws $c$ $c$ for opening by each other and varying the spaces C C, in combination with the swivel guard-plate $d$ attached to the spring D and the stand A, all arranged and operating substantially as and for the purpose herein described.

2. The shifting spring E, in combination with the springs B B, arranged and operating as and for the purpose herein set forth.

3. The movable stand A, provided with the point $h$ or its equivalent, and the head F in combination with the spud $a$, arranged as and for the purpose herein specified.

The above specification of my invention signed by me this fifth day of December, 1866.

S. TERRY HUDSON.

Witnesses:
BENJ. J. GRIFFIN,
M. E. HUDSON.